(12) United States Patent
Sun (10) Patent No.: US 9,671,585 B2
(45) Date of Patent: Jun. 6, 2017

(54) IMAGING LENS ASSEMBLY

(71) Applicant: Vista Optronics, Inc, Xiamen (CN)

(72) Inventor: Fengqing Sun, Austin, TX (US)

(73) Assignee: Vista Optronics, INC, Xiamen (CN)

( * ) Notice: Subject to any disclaimer, the term of this patent is extended or adjusted under 35 U.S.C. 154(b) by 0 days.

(21) Appl. No.: 14/804,083

(22) Filed: Jul. 20, 2015

(65) Prior Publication Data

US 2017/0010438 A1     Jan. 12, 2017

(30) Foreign Application Priority Data

Jul. 6, 2015  (CN) .......................... 2015 1 0388767

(51) Int. Cl.
| | |
|---|---|
| G02B 13/18 | (2006.01) |
| G02B 9/16 | (2006.01) |
| G02B 13/00 | (2006.01) |

(52) U.S. Cl.
CPC ............ G02B 9/16 (2013.01); G02B 13/0035 (2013.01)

(58) Field of Classification Search
CPC ........ G02B 13/0035; G02B 9/12; G02B 9/14; G02B 9/30; G02B 9/32; G02B 15/24; G02B 15/28
USPC ....... 359/644, 645, 689, 690, 708, 716, 735, 359/784
See application file for complete search history.

(56) References Cited

U.S. PATENT DOCUMENTS

| | | |
|---|---|---|
| 7,394,602 B2 | 7/2008 | Chen et al. |
| 7,436,603 B2 | 10/2008 | Huang et al. |
| 7,443,613 B2 | 10/2008 | Noda et al. |
| 7,468,847 B2 | 12/2008 | Tang et al. |
| 7,679,841 B2 | 3/2010 | Chen et al. |
| 7,684,128 B2 | 3/2010 | Tang |
| 7,894,142 B1 | 2/2011 | Tang |
| 7,898,747 B2 | 3/2011 | Tang |
| 7,916,401 B2 | 3/2011 | Chen et al. |
| 7,948,692 B2 | 5/2011 | Tang et al. |
| 7,957,075 B2 | 6/2011 | Tang |
| 7,974,014 B2 | 7/2011 | Tang |
| 8,000,033 B1 | 8/2011 | Tang |

(Continued)

FOREIGN PATENT DOCUMENTS

| | | |
|---|---|---|
| CN | 2824074 Y | 10/2006 |
| CN | 103217767 A | 7/2013 |

*Primary Examiner* — Stephone B Allen
*Assistant Examiner* — Travis Fissel
(74) *Attorney, Agent, or Firm* — Treasure IP Group, LLC (57) ABSTRACT

An imaging lens assembly includes, in order from an object side to an image side, a first lens element with positive refractive power, a second lens element with negative refractive power, a third lens element with positive refractive power. The first lens element has a convex image-side surface in a paraxial region. The second lens element has a concave object-side surface and a convex image-side surface in a paraxial region, and at least one of its surfaces is aspheric. The object-side surface of the third lens element is convex in a paraxial region and concave in a peripheral region. The image-side surface of the third lens element is concave in a paraxial region. The object-side surface and image-side surface of the third lens element are both aspheric. The imaging lens assembly satisfies 0.062 mm<D<0.091 mm, where D represents the maximum effective focus shifts range under all the defocus curves at 0.4 modulus of the OTF (optical transfer function).

10 Claims, 8 Drawing Sheets

(56) References Cited

U.S. PATENT DOCUMENTS

| | | |
|---|---|---|
| 8,081,393 B2 | 12/2011 | Tang |
| 8,094,231 B2 | 1/2012 | Tsai |
| 8,154,807 B2 | 4/2012 | Tsai |
| 8,508,866 B2* | 8/2013 | Teraoka ............. G02B 13/0035 359/716 |
| 2003/0193605 A1* | 10/2003 | Yamaguchi .............. G02B 9/14 348/335 |
| 2011/0304764 A1* | 12/2011 | Shigemitsu ........ G02B 13/0035 348/345 |
| 2013/0188266 A1* | 7/2013 | Tsai ................... G02B 13/0035 359/716 |
| 2013/0235476 A1* | 9/2013 | Hsieh ................. G02B 13/0035 359/716 |
| 2015/0338610 A1* | 11/2015 | Hsieh ................. G02B 27/0025 348/360 |

* cited by examiner

IMAGING LENS ASSEMBLY

CROSS REFERENCE TO RELATED APPLICATION

This application claims priority to Chinese Application No. CN 201510388767.0, filed on Jul. 6, 2015. The Chinese Application is incorporated herein by reference in its entirety.

BACKGROUND OF THE INVENTION

1. Field of the Invention

The present invention relates to an imaging lens assembly and more particularly to an imaging lens assembly has triplet lens elements and used in portable devices.

2. Description of the Prior Art

In recent years, the development of the optical lens assembly in digital cameras, web cameras and mobile phone cameras becomes more rapid with the sharp increase in demand of people for high image capturing quality. High resolution, large field of view for sub camera, smaller size and etc are all considered more and more by consumers.

Generally, for the sake of meeting customers' demands, especially demands for high imaging quality, a conventional lens assembly is designed to be a three-lens structure comprising a first glass lens element with positive refractive power, a second glass or plastic lens element with negative refractive power and a third lens element with non-spherical surfaces, whereby to reduce aberrations and the total track length of the optical system. However, the manufacturer found it hard to maintain a high yield of lens assembly while keeping a relative high imaging quality since the cementing procedure conducted on the first and second lens elements is difficult to control and the aspheric coefficients of lens elements are not preferable yet. Besides, the defocus state of a lens assembly will significantly influence the performance of the whole camera in auto-focusing which was confirmed by the assembling factory. And the aspheric coefficient of lens element does play an important role in confining the defocus state.

How to achieve a quick focusing module with less aberrations, and balance the weight between high imaging quality and manufacturing feasibility is the key topics in lens assembly fabrication, therefore, there is need to construct a favorable lens assembly structure with a good adjustment of its structure and aspheric coefficients.

A patent CN2824074 discloses an imaging lens assembly which comprises, in order from the object-side to the image-side, a first lens with positive refractive power has a convex object-side surface, a second lens with refractive power shrinking along the optical axis direction has a non-spherical object-side surface, a third lens with negative refractive power has a non-spherical object-side surface being convex. And both the second and third lenses are made of plastic. This imaging lens assembly can achieve good imaging quality when keep a relative short total track length since the second lens with negative refractive power contributing to a thin central thickness. This invention also can reduce the chromatic aberration and improve the color saturation of the image. But the invention is not conducted through adjusting relationships between aspheric coefficients, not performed with a good defocus state either.

SUMMARY OF THE INVENTION

The present invention provides a three-element imaging lens assembly. With controlling the refractive power and key relationship between each aspheric coefficient, high image quality of the imaging lens assembly will be achieved. According to one disclosure of the present invention, an imaging lens assembly includes, in order from an object side to an image side, a first lens element, a second lens element, a third lens element. The first lens element with positive refractive power has a convex image-side surface in a paraxial region. The second lens element with negative refractive power has a concave object-side surface and a convex image-side surface in a paraxial region, and at least one of its surfaces is aspheric. The third lens element with positive refractive power has an object-side surface which is convex in a paraxial region and concave in a peripheral region, and an image-side surface of the third lens element which is concave, wherein both of the object-side surface and the image-side surface of the third lens element are aspheric.

In one imaging lens assembly of the present disclosure, the imaging lens assembly satisfies:

$0.062 \text{ mm} < D < 0.091 \text{ mm}$, $-2272 \leq A14/(A4*1000) < -18.17$;

$27.44 < A12/A8 < 42.87$;

$-2.931 < (A10+A12)/1000 < -2.501$;

$-10.09 < (A14+A16)/1000 < -5.723$;

$4.09 < T/AG < 4.70$;

where the D represents the maximum effective focus shifts range under all the defocus curves at 0.4 modulus of the OTF (optical transfer function), the A4 respectively represent the 4th-order, A8 is the 8th-order aspheric coefficient, A10 is the 10th-order aspheric coefficient, A12 is the 12th-order aspheric coefficient, A14 is the 14th-order aspheric coefficients, A16 is the 16th-order aspheric coefficient, and T is the total thickness of three lenses, AG is the total thickness of air gap between the first lens and the third lens.

Parameters for non-spherical surfaces are basically defined by, but not limited to, the following aspheric surface profiles equation:

$$X(Y) = \frac{(Y^2/R)}{\left(\sqrt{1-(1+k)\frac{Y^2}{R^2}}\right)} + \sum_i Ai * Y^i$$

Where X is the relative distance between a point on the aspheric surface at a distance Y from the optical axis and the tangential plane at the aspheric surface vertex, Y is the distance from the point on the curve of the aspheric surface to the optical axis, R represents the curvature radius of the surface, k represents a conic factor and Ai represents an $i^{th}$-order aspheric coefficient of the lens surface. In the embodiments, i may be but not limited to 2, 4, 6, 8, 10, 12, 14, 16, 18.

DETAILED DESCRIPTION OF THE PREFERRED EMBODIMENTS

The imaging lens assembly of the present disclosure is described in greater detail with illustrating embodiments thereof In one present disclosure, the optical system with an imaging lens assembly, sequentially arranged from an object side to an image side along an optical axis, comprises an aperture stop, a first lens element, a second lens element, a third lens element, an IR-cut filter (infrared-cut filter) and an image plane. The aperture stop is deposed between the object-side and the first lens, which can control the total light rays passing through to reduce flares and keep from ghost shadow or light spots. The first lens element with positive refractive power has a convex object side surface and a convex image side surface so that the total track length of the assembly can be restrict into a settled range. The second lens element has negative refractive power which can balance the refractive power of the whole system, the concave object side surface and convex image-side surface of the second lens element thereof being aspheric which help to modify the aberration and distortion caused by the first lens element. The third lens element with positive refractive power has an object side surface being convex in a paraxial region and concave in a peripheral region, and an image side surface being convex in a paraxial region, which allows the astigmatism and high order aberrations of the system to be favorably corrected. Both the object-side and image-side of the third lens element are aspheric so that the spherical aberration and field curvature can be further corrected.

In the aforementioned disclosure of imaging lens assembly, D represents the maximum effective focus shifts range under all the defocus curves at 0.4 modulus of the OTF (optical transfer function), BFL is the back focal length, TTL is the total track length, IMAGEH is the image height, and EFL is the effective focal length of the imaging lens assembly. A4-A18 represent the $4^{th}$-$18^{th}$-order aspheric coefficient of the second lens element.

When 0.062 mm<D<0.091 mm is satisfied, the depth of focus could achieve a larger value which is favorable for the auto-focusing in application.

The imaging lens assembly satisfies: $-2272<A14/(A4*1000)<-18.17$ so that some fabricating preferred higher order aspheric coefficients can be reserve without much more modifications.

The relation of $27.44<A12/A8<42.87$ will help to reduce the astigmatism of the system.

When $-2.931<(A10+A12)/1000<-2.501$ is satisfied, it will be favorable to modified chromatic aberrations of the system.

When the relation $-10.09<(A14+A16)/1000<-5.723$ is satisfied, the off-axis aberrations can be effectively reduced.

R1 represent the curvature radius of the object-side surface in the first lens element; R5 represent the curvature radius of the object-side surface, and R6 represent the curvature radiuses of the image-side surface in the third lens element. The imaging lens assembly satisfies $0.856<R1/(R5+R6)<1.00$ so that the spherical aberration of the system can be dramatically reduced.

R2 represent the curvature radiuses of the image-side surface in the first lens element; R3 represent the curvature radius of the object-side surface, R4 represent the curvature radiuses of the image-side surface in the second lens element. The imaging lens assembly satisfies $0.5882<R2/(R3+R4)<0.8598$ so that the coma of the system will be modified to a relative small range.

When the relation $0.1829<BFL/EFL<0.1989$ is satisfied, it will be favorable for this imaging lens assembly to apply into portable devices since the portable devices used to be applied in taking pictures with a relative short distance.

When the relation $1.890<TTL/IMAGEH<1.997$ is satisfied, the expectation for a relative compact system with good image quality can be achieved at the same time.

If the relation $4.09<T/AG<4.70$ satisfied, the field curve of system can be modified preferably.

By confining the aspheric coefficients into specific range, the focus centers under 0,0.6, and 0.9 field of view almost can be constrained in a line so that the imaging lens assembly could achieve large depth of focus while keep a good imaging quality. In practice, pictures taken by this lens assembly will be more clear than usual. Here, items like spherical aberration, field curvature and distortion were used to evaluate imaging quality, and for example, the value of distortion should be under 2%; the smaller the distances between three lines are in the longitudinal aberration, the better the chromatic property is. Also, smaller space between S and T curves will be better. In each aberration figure, the Y-axis is the value of image height in millimeters.

All the embodiments were measured with some constant coefficients except thickness, radius and the aspheric coefficients of the second lens. The constant coefficients are all manufacture preferable Referring to FIG. 1 to 1C for the first embodiment of the present invention, the imaging lens assembly, sequentially arranged from an object side to an image side along an optical axis, comprises an aperture stop 100, a first lens element 110, a second lens element 120, a third lens element 130, an IR-cut filter 140 and an image plane 150, wherein all the lens elements 110, 120 and 130 are made of plastic.

Figure 1:
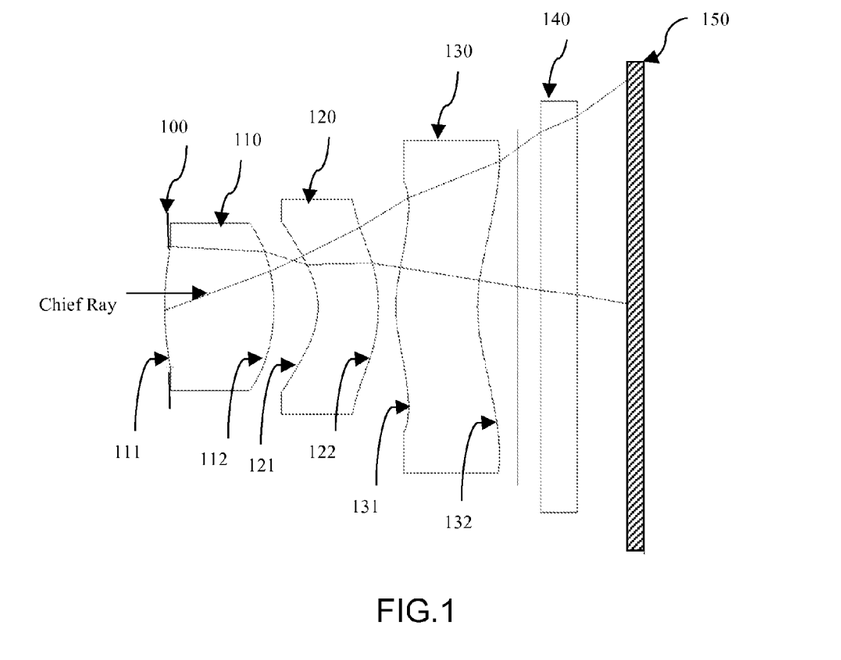
FIG. 1 shows an imaging lens assembly in accordance with a first embodiment for the disclosure.

The first lens element 110 with positive refractive power has a convex object side surface 111 in a paraxial region and a convex image side surface 112. The second lens element 120 with negative refractive power has a concave object side surface 121 in a paraxial region and a convex image-side surface 122 and both the object-side 121 and image-side 122 of the second lens element 120 thereof being aspheric. The third lens element 130 with positive refractive power has an object side surface 131 being convex in a paraxial region and concave in a peripheral region, and an image side surface 132 being convex in a paraxial region, and both the object-side 131 and image-side 132 of the third lens element 130 thereof being aspheric.

Figure 2:
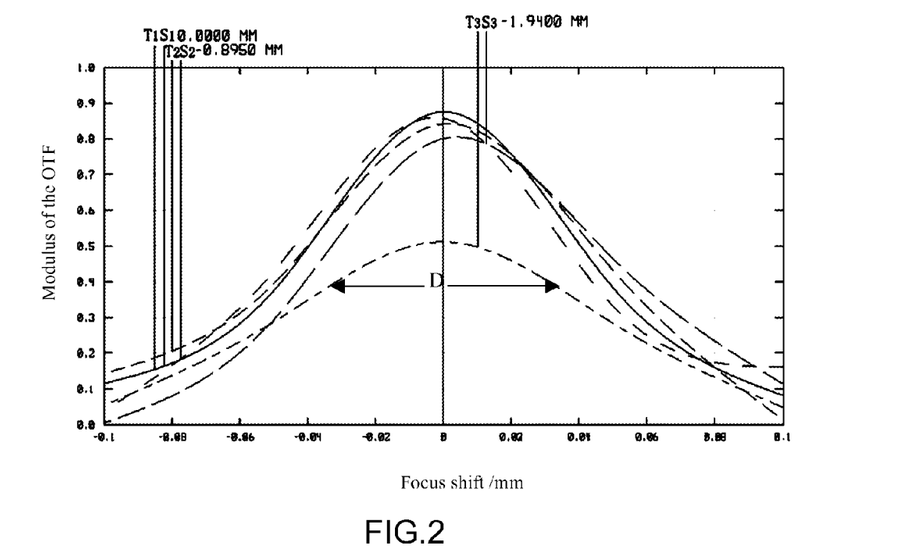
FIG. 2 shows the defocus curve of the first embodiment for the disclosure.
Figure 3:
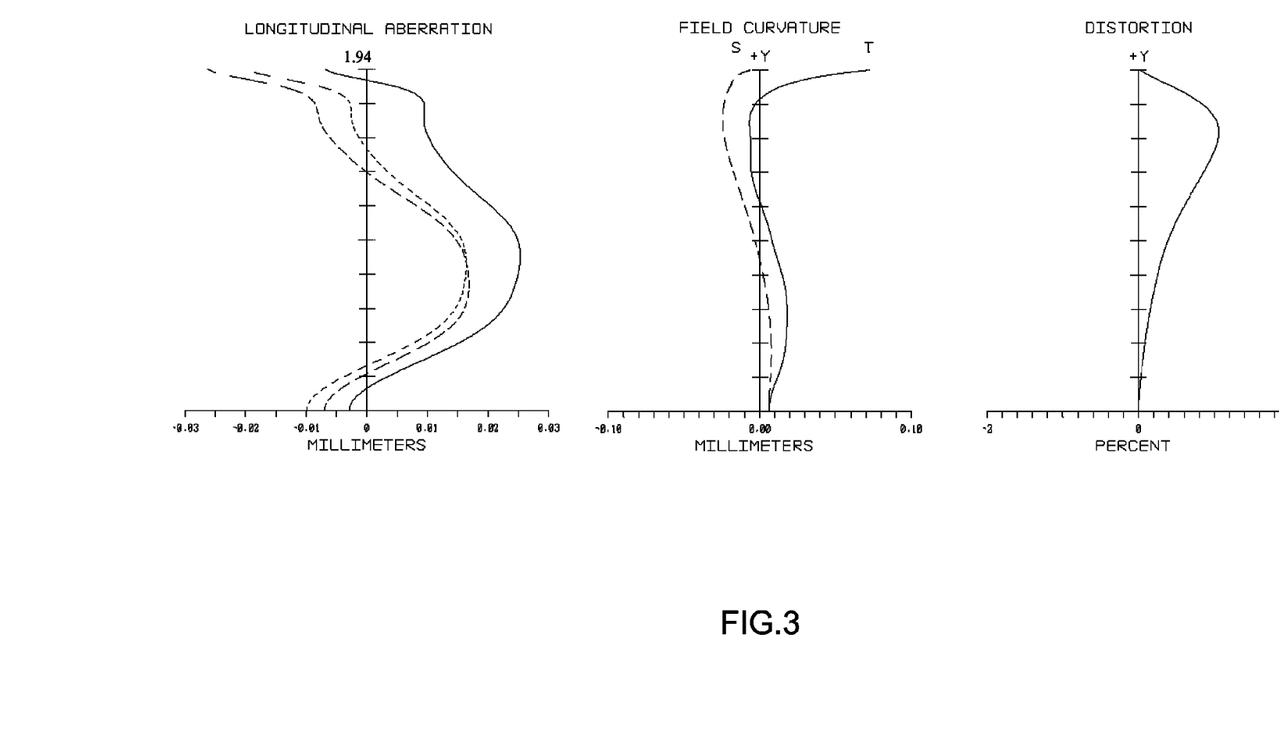
FIG. 3 shows the aberration curves of the first embodiment for the disclosure.

What is revealed in FIG. 2 is the defocus status of the first embodiment. Each defocus curve was measured under one corresponding field which includes sagittal and tangential plane, and we measured defocus curves respectively under 3 different fields include 0.0 mm, −0.895 mm, −1.940 mm. All the embodiments in all disclosures of this invention share the same testing conditions and definition of every parameter, which will not be stated again. It can be seen in FIG. 2 that the effective depth of focus remains a relative wide extent even though the MTF peak of 1.94 mm field goes down.

The detailed information of imaging lens assembly in the first embodiment is shown in TABLE 1-1 and 1-2 below.

TABLE 1-1

Embodiment 1
f = 2.79, F# = 2.85, HFOV = 37.43°,

| | Surface No. | Curvature radius (mm) | Thickness (mm) | Refractive Index (Nd) | Dispersion coefficient (Vd) |
|---|---|---|---|---|---|
| Aperture stop | ~ | ~ | 0.046 | | |
| First lens element | 111 | 2.290 | 0.882 | 1.544 | 59.43 |
| | 112 | −1.558 | 0.356 | | |
| Second lens element | 121 | −0.611 | 0.487 | 1.636 | 21.96 |
| | 122 | −1.201 | 0.140 | | |
| Third lens element | 131 | 0.920 | 0.661 | 1.544 | 59.43 |
| | 132 | 1.754 | 0.324 | | |
| IR-cut filter | 141 | ~ | 0.3 | 1.517 | 64.17 |
| | 142 | ~ | 0.541 | | |
| Image plane | 150 | ~ | ~ | ~ | ~ |

In TABLE 1-1, f represents the effect focal length, F# represents the F number and HFOV represents the half of maximal field of view of the system in disclosed embodiment. The aspheric coefficients of each surface satisfy the aspheric surface profiles equation and are referred in TABLE 1-2 below where A4 to A18 represent the $4^{th}$ to $18^{th}$-order aspheric coefficient respectively and k is conic index in the aspheric surface profiles equation. All labels for TABLE of the remaining embodiments share the same definitions as those in TABLE 1-1 and TABLE 1-2 in the first embodiment, and their definitions will not be stated again.

TABLE 1-2

Aspheric Coefficients

| | Sur. No. | | | | | |
|---|---|---|---|---|---|---|
| | 111 | 112 | 121 | 122 | 131 | 132 |
| k | 13.37 | 2.630 | −1.490 | −18.34 | −9.915 | −1.153 |
| A4 | −3.6796E−01 | −3.3973E−02 | −3.5333E−01 | −1.6809E+00 | −6.1018E−01 | −4.7099E−01 |
| A6 | 5.3952E+00 | −2.3155E−01 | 1.0149E+01 | 9.1701E+00 | 2.4995E+00 | 6.6076E−01 |
| A8 | −1.4461E+02 | 3.6300E+00 | −1.1528E+02 | −3.6751E+01 | −8.2498E+00 | −8.4976E−01 |
| A10 | 2.1308E+03 | −1.5079E+01 | 8.1718E+02 | 1.1554E+02 | 1.9497E+01 | 8.7415E−01 |
| A12 | −1.9722E+04 | 1.0034E+01 | −3.6045E+03 | −2.6018E+02 | −3.2288E+01 | −6.6470E−01 |
| A14 | ~ | ~ | 9.9525E+03 | 3.9644E+03 | 3.6322E+01 | 3.4831E−02 |
| A16 | ~ | ~ | −1.6805E+04 | −3.8600E+03 | −2.6560E+01 | −1.1774E−02 |
| A18 | ~ | ~ | 1.5902E+04 | 2.1574E+04 | 1.1442E+01 | 2.3026E−02 |

Figure 4:
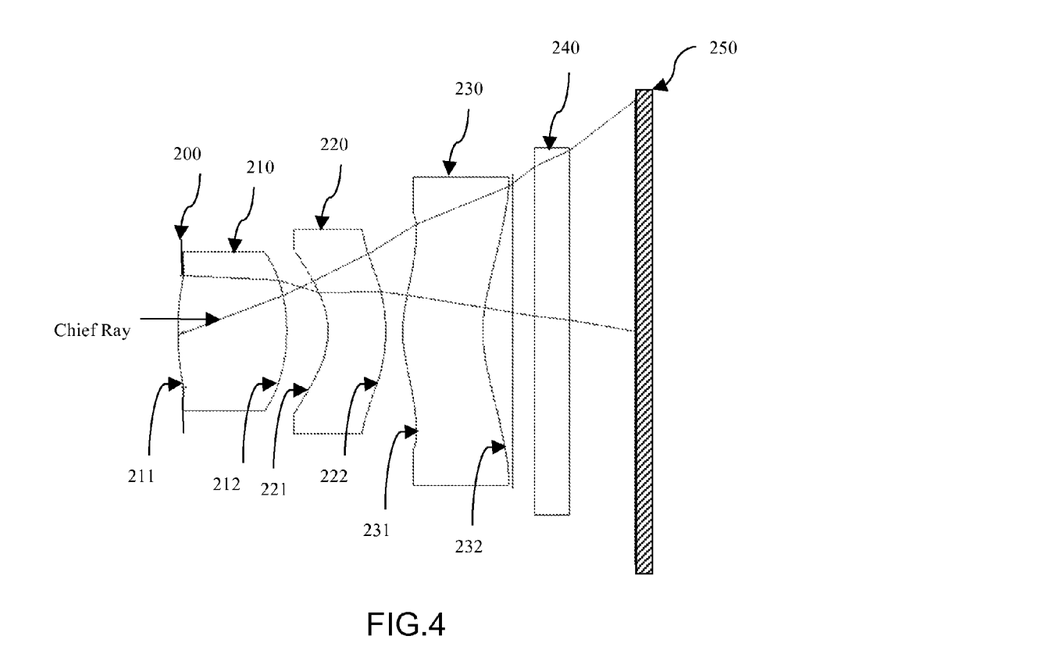
FIG. 4 shows an imaging lens assembly in accordance with a second embodiment for the disclosure.

With reference to FIG. 4 the imaging lens assembly in second embodiment of the present invention, sequentially arranged from an object side to an image side along an optical axis, comprises an aperture stop 200, a first lens element 210, a second lens element 220, a third lens element 230, an IR-cut filter 240 and an image plane 250.

The first lens element 210 with positive refractive power has a convex object side surface 211 in a paraxial region and a convex image side surface 212. The second lens element 220 with negative refractive power has a concave object side surface 221 in a paraxial region and a convex image-side surface 222 and both the object-side 221 and image-side 222 of the second lens element 220 thereof being aspheric. The third lens element 230 with positive refractive power has an object side surface 231 being convex in a paraxial region and concave in a peripheral region, and an image side surface 232 being convex in a paraxial region, and both the object-side 231 and image-side 232 of the third lens element 230 thereof being aspheric.

Figure 5:
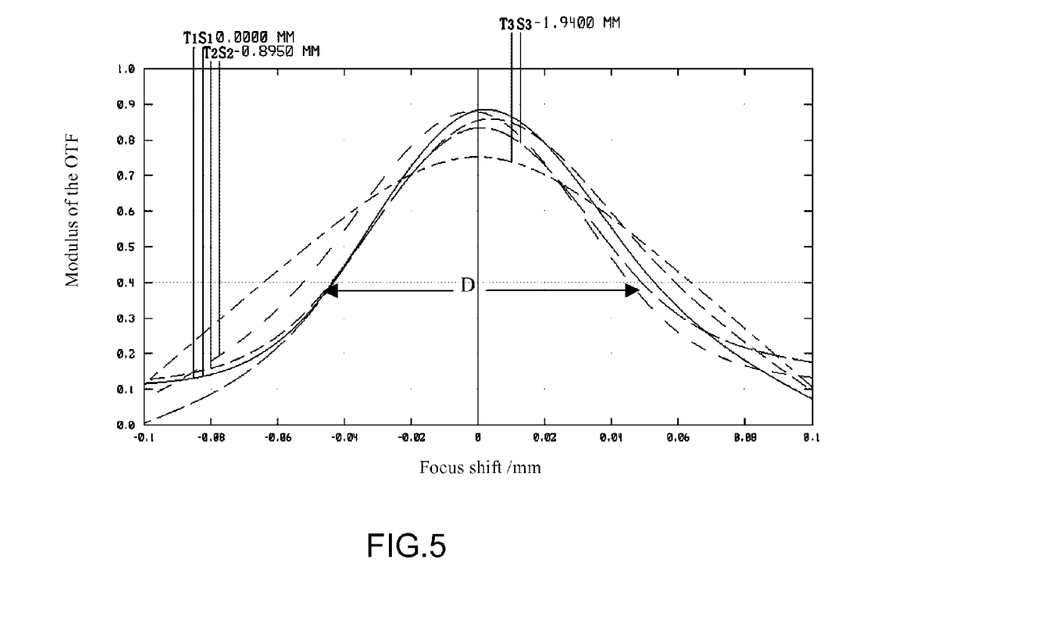
FIG. 5 shows the defocus curve of the second embodiment for the disclosure.
Figure 6:
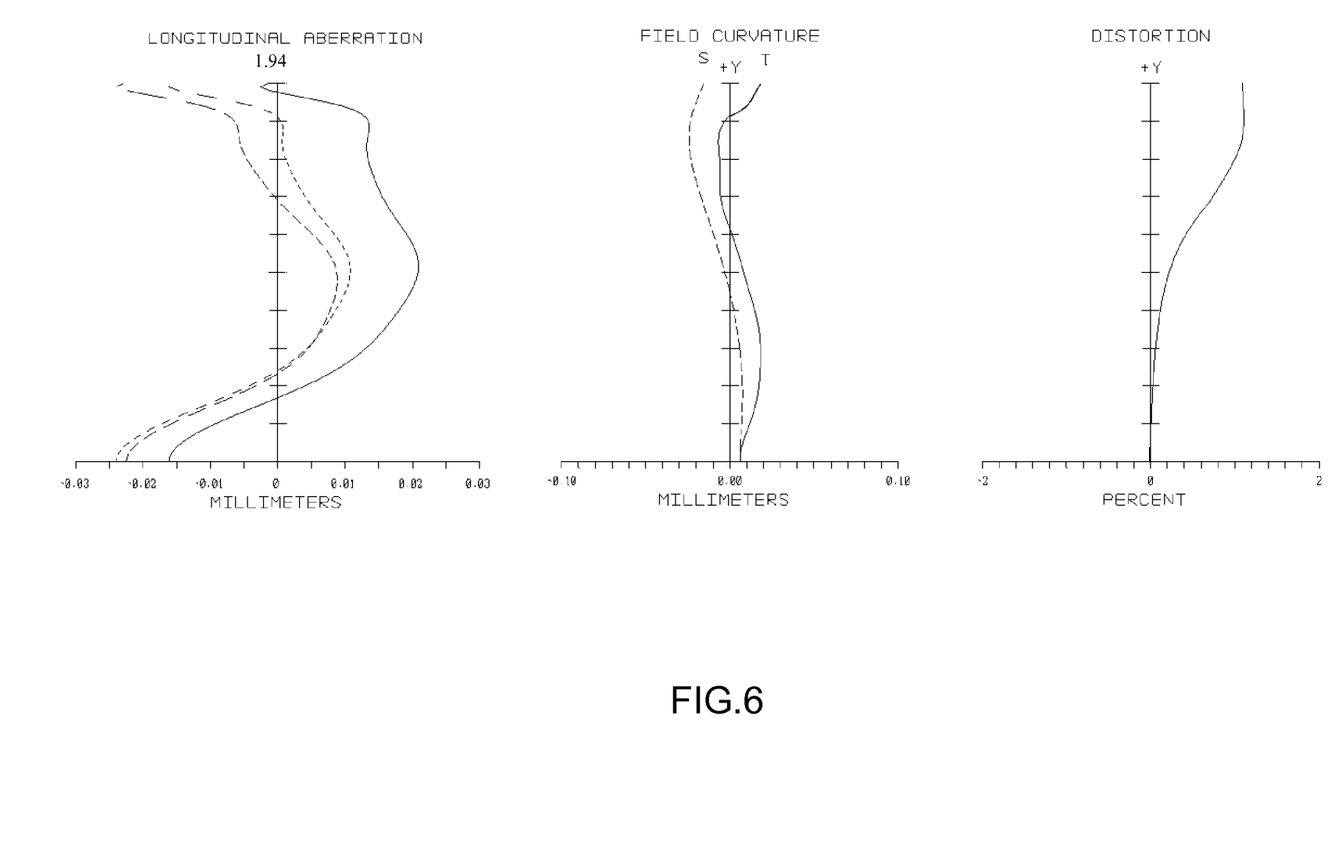
FIG. 6 shows the aberration curves of the second embodiment for the disclosure.

What is revealed in FIG. 5 is the defocus status of the second embodiment. It can be seen in FIG. 5 that most peaks of curves located near the zero-shift vertical axis, which means the lens assembly has a good defocus status so that the effective depth of focus of the lens optical system can achieve a larger maximum value. All the MTF peaks in every field stay in a high value zone.

The detailed information of imaging lens assembly in the second embodiment is shown in TABLE 2-1 and 2-2 below.

TABLE 2-1

Embodiment 2
f = 2.69, F# = 2.85, HFOV = 37.89°,

| | Surface No. | Curvature radius (mm) | Thickness (mm) | Refractive Index (Nd) | Dispersion coefficient (Vd) |
|---|---|---|---|---|---|
| Aperture stop | ~ | infinity | 0.046 | | |
| First lens element | 211 | 2.175 | 0.911 | 1.544 | 59.43 |
| | 212 | −1.516 | 0.346 | | |
| Second lens element | 221 | −0.671 | 0.481 | 1.636 | 21.96 |
| | 222 | −1.840 | 0.144 | | |
| Third lens element | 231 | 0.922 | 0.672 | 1.544 | 55.90 |
| | 232 | 1.253 | 0.245 | | |
| IR-cut filter | 241 | infinity | 0.3 | 1.517 | 64.17 |
| | 242 | infinity | 0.541 | | |
| Image plane | 250 | infinity | ~ | ~ | ~ |

TABLE 2-2

Aspheric Coefficients

| | Sur. No. | | | | | |
|---|---|---|---|---|---|---|
| | 211 | 212 | 221 | 222 | 231 | 232 |
| k | 12.80 | 2.671 | −0.7255 | −17.48 | −9.293 | −1.173 |
| A4 | −3.6796E−01 | −3.3973E−02 | −3.0347E−01 | −1.6809E+00 | −6.1018E−01 | −4.7099E−01 |
| A6 | 5.3952E+00 | −2.3155E−01 | 1.3361E+01 | 9.1701E+00 | 2.4995E+00 | 6.6076E−01 |
| A8 | −1.4461E+02 | 3.6300E+00 | −1.4080E+02 | −3.6751E+01 | −8.2498E+00 | −8.4976E−01 |
| A10 | 2.1308E+03 | −1.5079E+01 | 9.3163E+02 | 1.1554E+02 | 1.9497E+01 | 8.7415E−01 |
| A12 | −1.9722E+04 | 1.0034E+01 | −3.8635E+03 | −2.6018E+02 | −3.2288E+01 | −6.6470E−01 |
| A14 | ~ | ~ | 1.0016E+04 | 3.9644E+03 | 3.6322E+01 | 3.4831E−02 |
| A16 | ~ | ~ | −1.5740E+04 | −3.8600E+03 | −2.6560E+01 | −1.1774E−02 |
| A18 | ~ | ~ | 1.3664E+04 | 2.1574E+04 | 1.1442E+01 | 2.3026E−02 |

Figure 7:
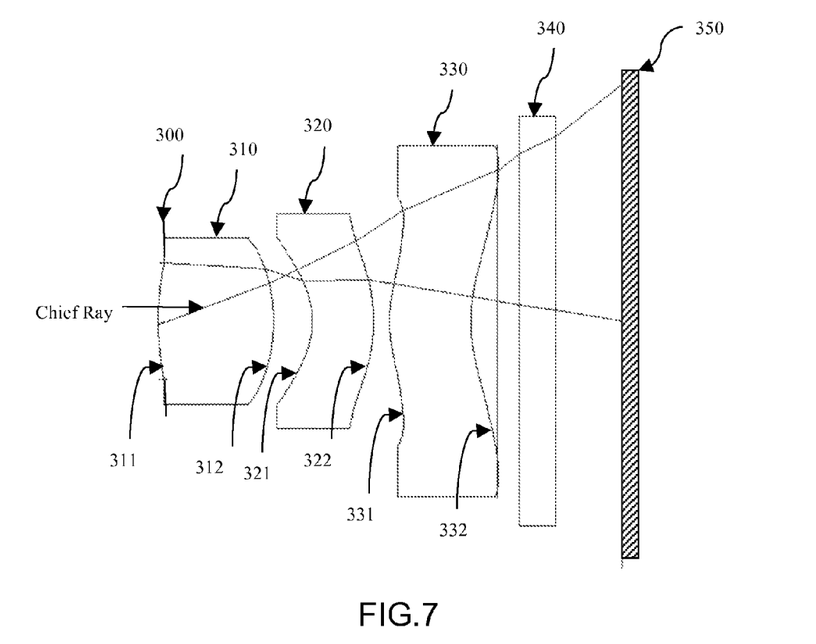
FIG. 7 shows an imaging lens assembly in accordance with a third embodiment for the disclosure.

Referring to FIG. 7 for the third embodiment of the present invention, the imaging lens assembly sequentially arranged from an object side to an image side along an optical axis, comprises an aperture stop 300, a first lens element 310, a second lens element 320, a third lens element 330, an IR-cut filter 340 and an image plane 350.

The first lens element 310 with positive refractive power has a convex object side surface 311 in a paraxial region and a convex image side surface 312. The second lens element 320 with negative refractive power has a concave object side surface 321 in a paraxial region and a convex image-side surface 322 and both the object-side 321 and image-side 322 of the second lens element 320 thereof being aspheric. The third lens element 330 with positive refractive power has an object side surface 331 being convex in a paraxial region and concave in a peripheral region, and an image side surface 332 being convex in a paraxial region, and both the object-side 331 and image-side 332 of the third lens element 330 thereof being aspheric.

Figure 8:
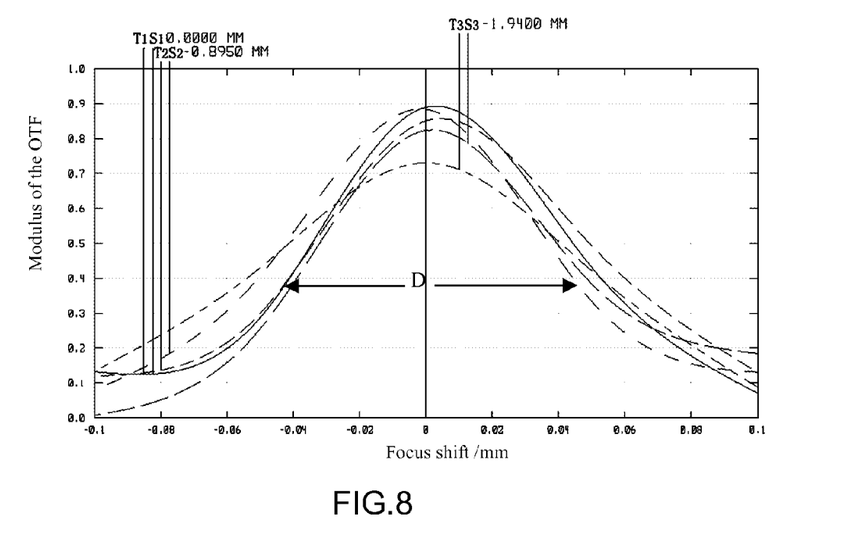
FIG. 8 shows the defocus curve of the third embodiment for the disclosure.
Figure 9:
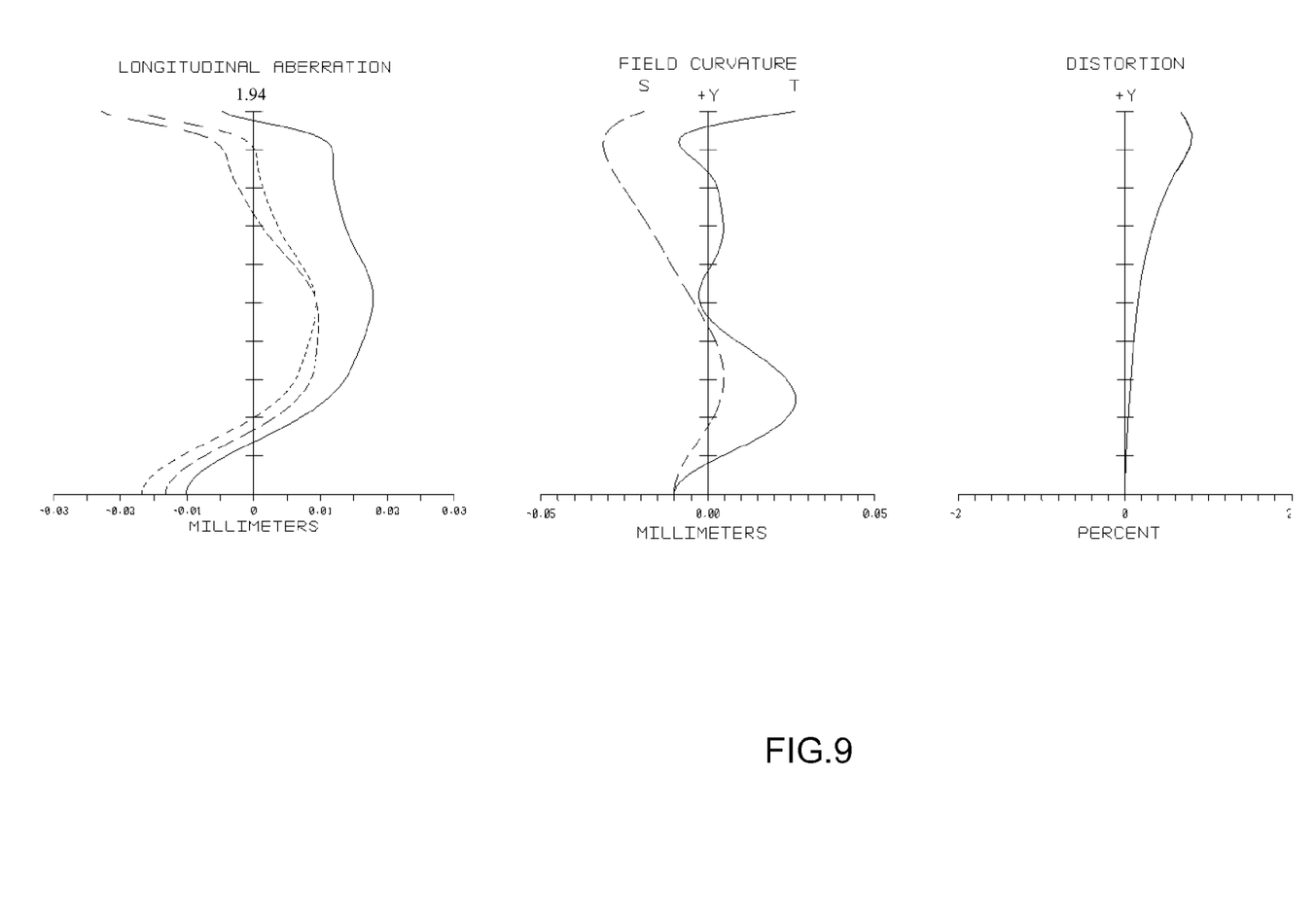
FIG. 9 shows the aberration curves of the third embodiment for the disclosure.

What is revealed in FIG. 8 is the defocus status of the second embodiment. It can be seen in FIG. 8 that most peaks of curves located near the zero-shift vertical axis, which means the lens assembly has a good defocus status so that the effective depth of focus of the lens optical system can achieve a larger maximum value.

The detailed information of imaging lens assembly in the third embodiment is shown in TABLE 3-1 and 3-2 below.

TABLE 3-1

Embodiment 3
f = 2.72, F# = 2.85, HFOV = 37.35°,

| Surface No. | | Curvature radius (mm) | Thickness (mm) | Refractive Index (Nd) | Dispersion coefficient (Vd) |
|---|---|---|---|---|---|
| Aperture stop | | ~ | infinity | 0.046 | |
| First lens element | 311 | 2.047 | 0.942 | 1.544 | 59.43 |
| | 312 | −1.490 | 0.317 | | |
| Second lens element | 321 | −0.666 | 0.498 | 1.630 | 21.96 |
| | 322 | −1.841 | 0.131 | | |
| Third lens element | 331 | 0.942 | 0.662 | 1.544 | 59.43 |
| | 332 | 1.212 | 0.213 | | |
| IR-cut filter | 341 | infinity | 0.3 | 1.517 | 64.17 |
| | 342 | infinity | 0.541 | | |
| Image plane | 350 | infinity | ~ | ~ | ~ |

TABLE 3-2

Aspheric Coefficients

| | Sur. No. | | | | | |
|---|---|---|---|---|---|---|
| | 311 | 312 | 321 | 322 | 331 | 332 |
| k | 11.026 | 2.622 | −0.9988 | −22.42 | −9.297 | −1.233 |
| A4 | −3.6796E−01 | −3.3973E−02 | −4.4195E−01 | −1.6809E+00 | −6.1018E−01 | −4.7099E−01 |
| A6 | 5.3952E+00 | −2.3155E−01 | 6.3709E+00 | 9.1701E+00 | 2.4995E+00 | 6.6076E−01 |
| A8 | −1.4461E+02 | 3.6300E+00 | −7.9851E+01 | −3.6751E+01 | −8.2498E+00 | −8.4976E−01 |
| A10 | 2.1308E+03 | −1.5079E+01 | 6.3962E+02 | 1.1554E+02 | 1.9497E+01 | 8.7415E−01 |
| A12 | −1.9722E+04 | 1.0034E+01 | −3.2061E+03 | −2.6018E+02 | −3.2288E+01 | −6.6470E−01 |
| A14 | ~ | ~ | 1.0043E+04 | 3.9644E+03 | 3.6322E+01 | 3.4831E−02 |
| A16 | ~ | ~ | −1.9142E+04 | −3.8600E+03 | −2.6560E+01 | −1.1774E−02 |
| A18 | ~ | ~ | 2.0295E+04 | 2.1574E+04 | 1.1442E+01 | 2.3026E−02 |

Figure 10:
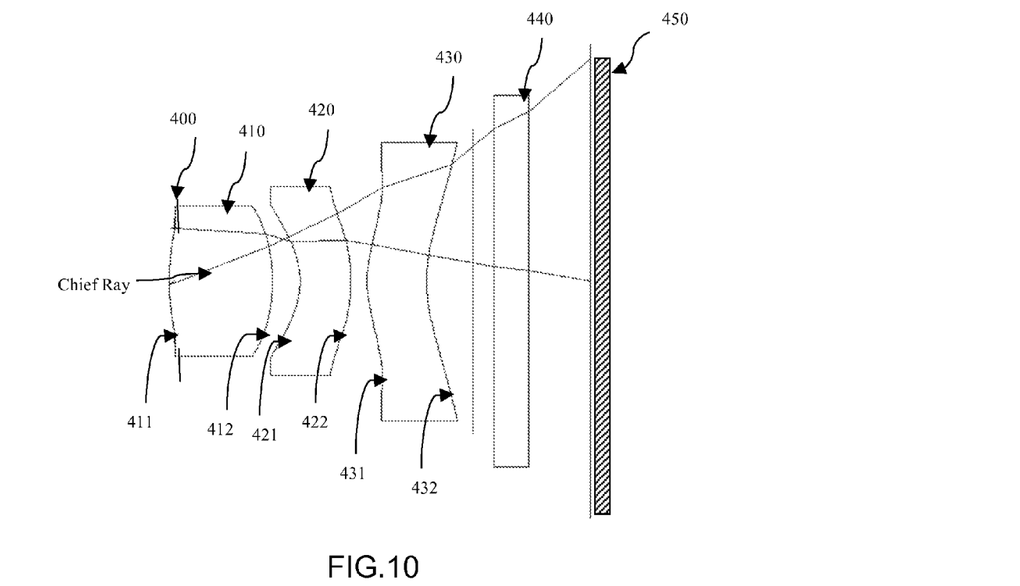
FIG. 10 shows an imaging lens assembly in accordance with a fourth embodiment for the disclosure.

Referring to FIG. 10 for the fourth embodiment of the present invention, the imaging lens assembly sequentially arranged from an object side to an image side along an optical axis comprises an aperture stop 400, a first lens element 410, a second lens element 420, a third lens element 430, an IR-cut filter 440 and an image plane 450.

The first lens element 410 with positive refractive power has a convex object side surface 411 in a paraxial region and a convex image side surface 412. The second lens element 420 with negative refractive power has a concave object side surface 421 in a paraxial region and a convex image-side surface 422 and both the object-side 421 and image-side 422 of the second lens element 420 thereof being aspheric. The third lens element 430 with positive refractive power has an object side surface 431 being convex in a paraxial region and concave in a peripheral region, and an image side surface 432 being convex in a paraxial region, and both the object-side 431 and image-side 432 of the third lens element 430 thereof being aspheric.

Figure 11:
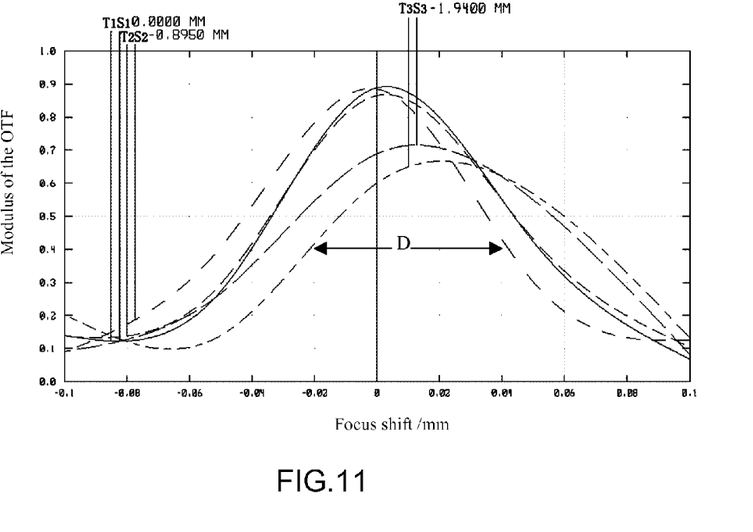
FIG. 11 shows the defocus curve of the fourth embodiment for the disclosure.
Figure 12:
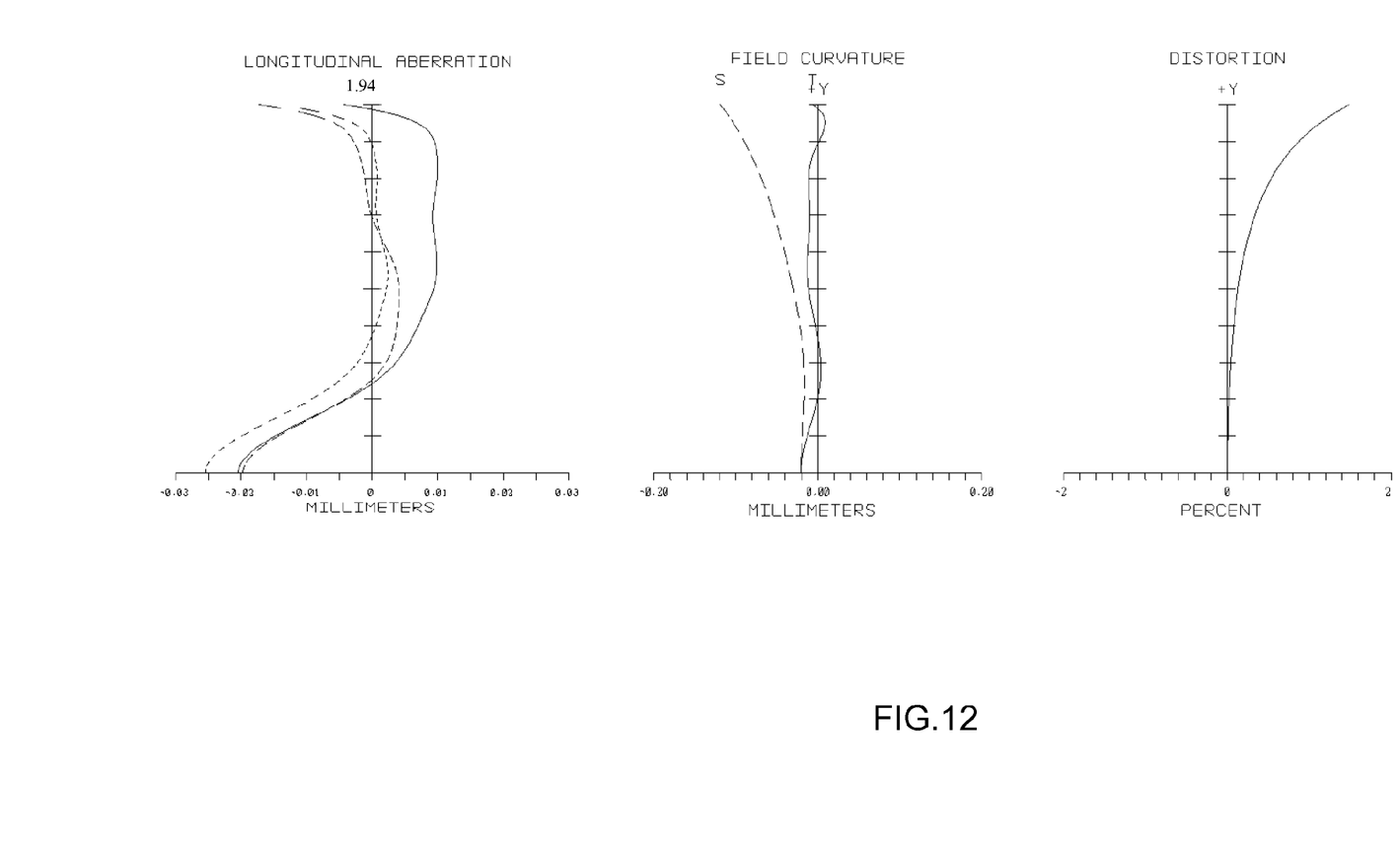
FIG. 12 shows the aberration curves of the fourth embodiment for the disclosure.

What is revealed in FIG. 11 is the defocus status of the sixth embodiment. It can be seen in FIG. 11 that most peaks of curves located near the zero-shift vertical axis, while the curve of field −1.94 mm has a shifting of 0.01 mm to 0.02 mm. However, the effective depth of focus of the lens optical system still has an acceptable value to manufacture.

The detailed information of imaging lens assembly in the fourth embodiment is shown in TABLE 4-1 and 4-2 below.

TABLE 4-1

Embodiment 4
f = 2.62, F# = 2.85, HFOV = 37.49°,

| | Surface No. | Curvature radius (mm) | Thickness (mm) | Refractive Index (Nd) | Dispersion coefficient (Vd) |
|---|---|---|---|---|---|
| Aperture stop | ~ | infinity | 0.046 | | |
| First lens | 411 | 2.008 | 0.896 | 1.544 | 59.43 |
| element | 412 | −1.551 | 0.241 | | |
| Second lens | 421 | −0.703 | 0.441 | 1.630 | 23.30 |
| element | 422 | −1.934 | 0.141 | | |
| Third lens | 431 | 0.866 | 0.516 | 1.544 | 59.43 |
| element | 432 | 1.205 | 0.406 | | |
| IR-cut filter | 441 | infinity | 0.3 | 1.517 | 64.17 |
| | 442 | infinity | 0.541 | | |
| Image plane | 450 | infinity | ~ | ~ | ~ |

TABLE 4-2

Aspheric Coefficients

| | Sur. No. | | | | | |
|---|---|---|---|---|---|---|
| | 411 | 412 | 421 | 422 | 431 | 432 |
| k | 10.66 | 2.971 | −1.037 | −21.93 | −7.503 | −0.9543 |
| A4 | −3.6796E−01 | −3.3973E−02 | −5.3050E−02 | −1.6809E+00 | −6.1018E−01 | −4.7099E−01 |
| A6 | 5.3952E+00 | −2.3155E−01 | 5.8729E+00 | 9.1701E+00 | 2.4995E+00 | 6.6076E−01 |
| A8 | −1.4461E+02 | 3.6300E+00 | −7.2206E+01 | −3.6751E+01 | −8.2498E+00 | −8.4976E−01 |
| A10 | 2.1308E+03 | −1.5079E+01 | 5.9460E+02 | 1.1554E+02 | 1.9497E+01 | 8.7415E−01 |
| A12 | −1.9722E+04 | 1.0034E+01 | −3.0953E+03 | −2.6018E+02 | −3.2288E+01 | −6.6470E−01 |
| A14 | ~ | ~ | 1.0119E+04 | 3.9644E+03 | 3.6322E+01 | 3.4831E−02 |
| A16 | ~ | ~ | −2.0210E+04 | −3.8600E+03 | −2.6560E+01 | −1.1774E−02 |
| A18 | ~ | ~ | 2.2540E+04 | 2.1574E+04 | 1.1442E+01 | 2.3026E−02 |

The detailed information of imaging lens assembly in all presented embodiment is shown in TABLE 7 below.

In TABLE 7, BFL is the back focal length, TTL is the total track length, IMAGEH is the image height and EFL is the effective focal length of disclosed embodiments for an imaging lens assembly. R1 represent the curvature radius of the object-side surface, R2 represent the curvature radiuses of the image-side surface in the first lens element. R3 represent the curvature radius of the object-side surface, R4 represent the curvature radiuses of the image-side surface in the second lens element. R5 represent the curvature radius of the object-side surface, R6 represent the curvature radiuses of the image-side surface in the third lens element.

TABLE 7

| | Embodiment | | | |
|---|---|---|---|---|
| | 1 | 2 | 3 | 4 |
| F# | 2.850 | 2.850 | 2.850 | 2.850 |
| BFL | 0.5251 | 0.4914 | 0.5311 | 0.5208 |
| TTL | 3.875 | 3.823 | 3.789 | 3.666 |
| IMAGEH | 1.940 | 1.940 | 1.940 | 1.940 |
| EFL | 2.789 | 2.686 | 2.723 | 2.619 |
| TTL/IMAGEH | 1.997 | 1.971 | 1.953 | 1.890 |
| BFL/EFL | 0.1883 | 0.1829 | 0.1950 | 0.1989 |
| A12/A8 | 31.27 | 27.44 | 40.15 | 42.87 |
| (A10 + A12)/1000 | −2.787 | −2.931 | −2.566 | −2.501 |
| (A14 + A16)/1000 | −6.853 | −5.723 | −9.098 | −10.09 |
| A14/(A4 * 1000) | −18.17 | −33.01 | −2272 | −190.7 |
| R1/(R5 + R6) | 0.8560 | 1.000 | 0.950 | 0.970 |
| R2/(R3 + R4) | 0.8598 | 0.6037 | 0.5943 | 0.5882 |
| T/AG | 4.09 | 4.21 | 4.69 | 4.70 |
| D | 0.062 mm | 0.091 mm | 0.086 mm | 0.066 mm |

What is claimed is:

1. An imaging lens assembly used in mobile devices, in order from an object side to an image side, comprising:
   a first lens element with positive refractive power wherein said first lens element has an object-side surface being convex in a paraxial region and a convex image-side surface in a paraxial region;
   a plastic second lens element with negative refractive power wherein said second lens element has a concave object-side surface and a convex image-side surface in a paraxial region and at least one surface of said second lens element is aspheric;
   a third lens element with positive refractive power comprising a object-side surface being convex in a paraxial region and concave in a peripheral region, and an image-side surface being concave in a paraxial region wherein said object-side surface and said image-side surface of said third lens element are aspheric;
   wherein the first lens, second lens and third lens is arranged in a sequential order from an object side to an image side; and wherein the imaging lens assembly used in mobile devices satisfies:

0.062 mm<$D$<0.091 mm, where the D represents a narrowest maximum effective focus shifts range under the defocus curves at 0.4 modulus of the OTF.

2. The imaging lens assembly used in mobile devices according to claim 1, wherein when A4 and A14 respectively represent a 4th-order and 14th-order aspheric coefficients of said second lens element on the object-side surface, and the imaging lens assembly satisfies the following conditions:

−2272<$A14/(A4*1000)$<−18.17.

3. The imaging lens assembly used in mobile devices according to claim 1, wherein when A8 is an 8th-order aspheric coefficient and A12 is a 12th-order aspheric coefficient of said second lens element, and the imaging lens assembly satisfies the following condition:

−27.44<$A12/A8$<42.87.

4. The imaging lens assembly used in mobile devices according to claim 1, wherein when A10 is a 10th-order aspheric coefficient and A12 is a 12th-order aspheric coefficient of said second lens element, and the imaging lens assembly satisfies the following condition:

−2.931<$(A10+A12)/1000$<−2.501.

5. The imaging lens assembly used in mobile devices according to claim 1, wherein when A14 is a 14th-order aspheric coefficient and A16 is a 16th-order aspheric coefficient of said second lens element, and the imaging lens assembly satisfies the following condition:

−10.09<$(A14+A16)/1000$<−5.723.

6. The imaging lens assembly used in mobile devices according to claim 1, wherein when R1 is a curvature radius of the object-side surface of said first lens element, R5 is a curvature radius of the object-side surface of said third lens element and R6 is a curvature radius of the image-side surface of said third lens element, and the imaging lens assembly satisfies the following conditions:

0.856<$R1/(R5+R6)$<1.00.

7. The imaging lens assembly used in mobile devices according to claim 1, wherein when R2 is a curvature radius of the image-side surface of said first lens element, R3 is a curvature radius of the object-side surface of said second lens element and R4 is a curvature radius of the image-side surface of said third lens element, and the imaging lens assembly satisfies the following conditions:

0.5882<$R2/(R3+R4)$<0.8598.

8. The imaging lens assembly used in mobile devices according to claim 1, wherein when BEL is a back focal length and EFL is an effective focal length of said imaging lens assembly, and the imaging lens assembly satisfies the following conditions:

0.1829<$BEL/EFL$<0.1989.

9. The imaging lens assembly used in mobile devices according to claim 1, wherein when TTL is a total track length, IMAGEH is an image height, and the imaging lens assembly satisfies the following conditions:

1.890<$TTL/IMAGEH$<1.997.

10. The imaging lens assembly used in mobile devices according to claim 1, wherein when T is a total thickness of three lenses, AG is a total thickness of an air gap between the first lens and the third lens, and the imaging lens assembly satisfies the following conditions:

4.09<$T/AG$<4.70.

* * * * *